United States Patent Office 2,899,561
Patented Aug. 11, 1959

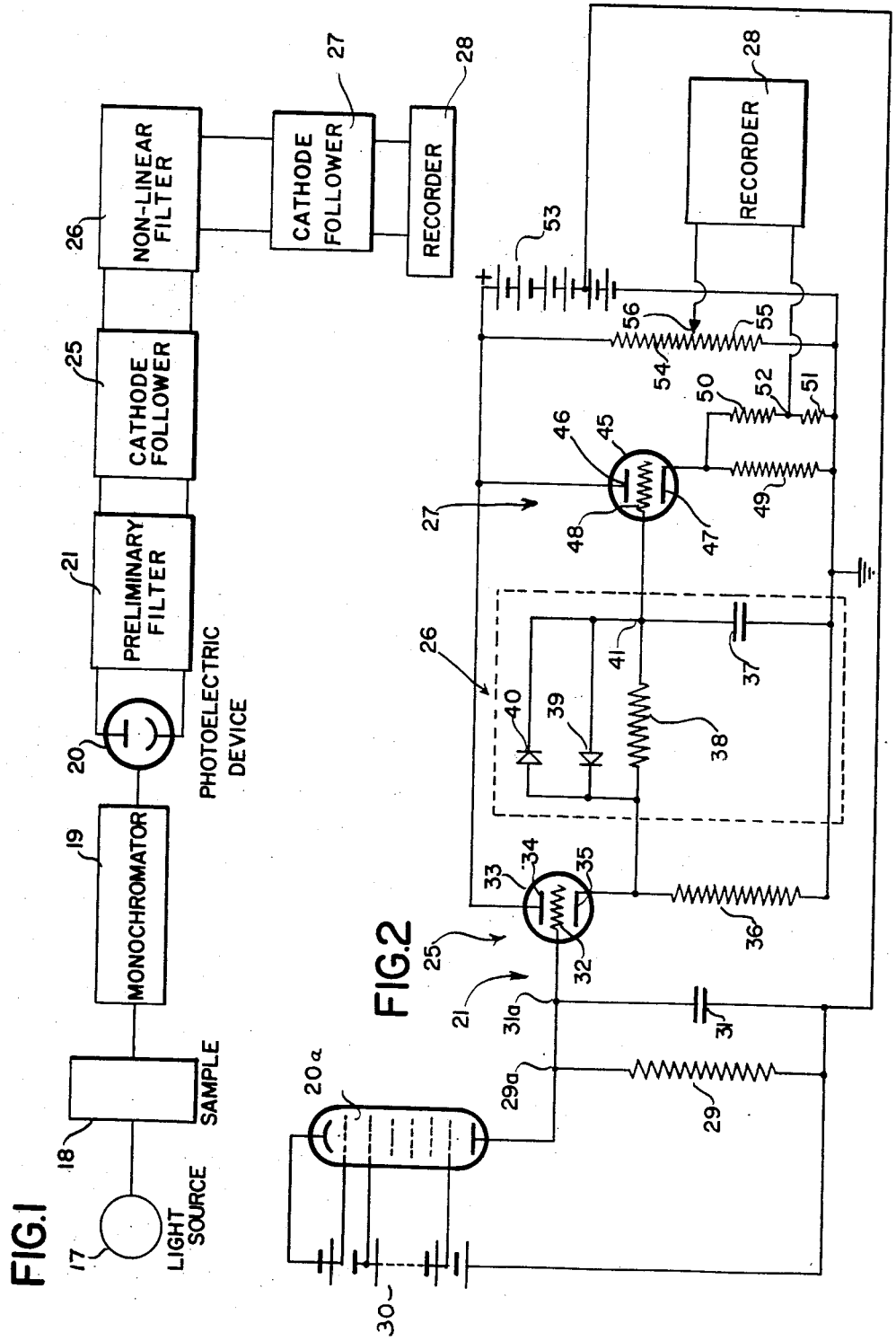

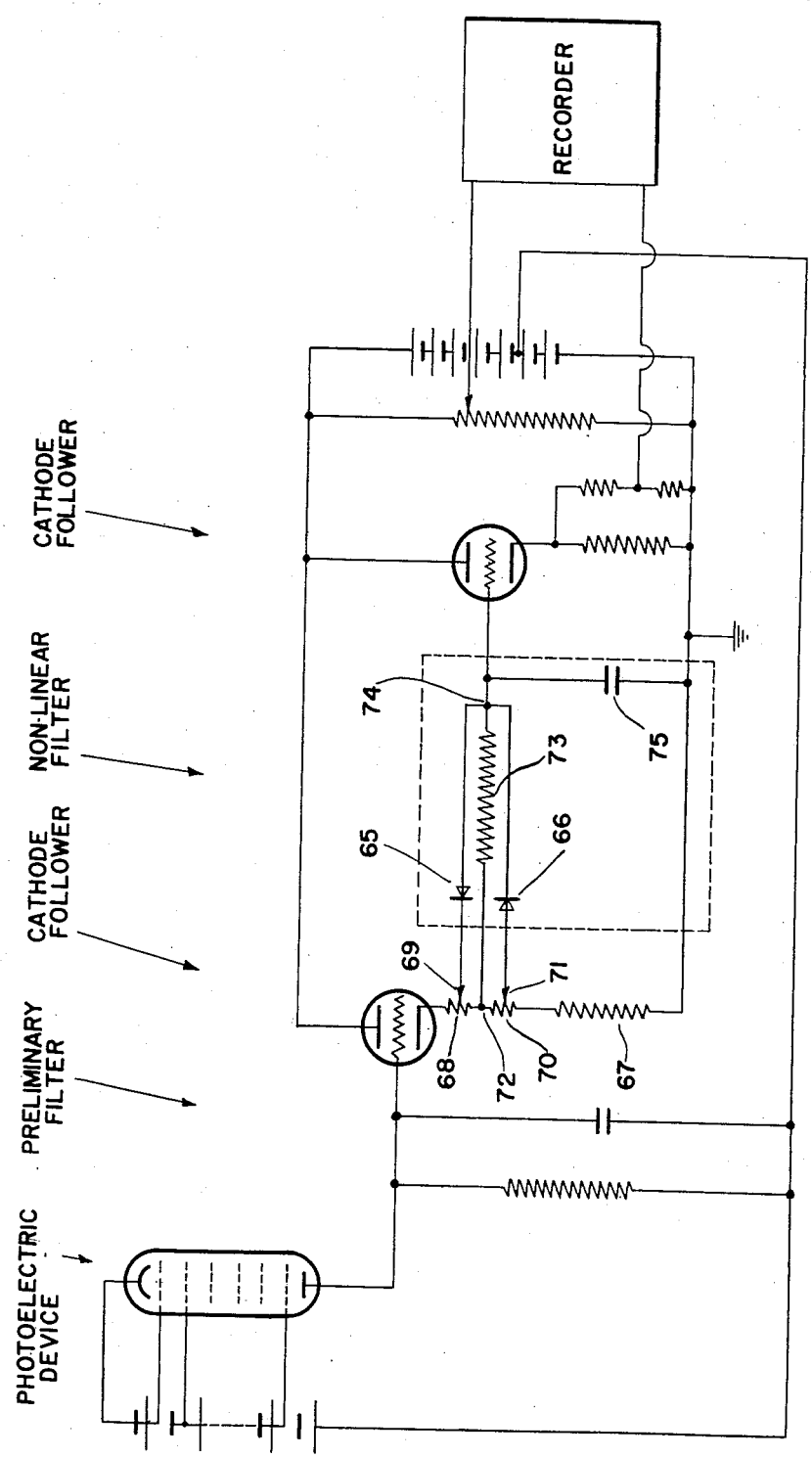

2,899,561

CIRCUITS FOR USE IN MEASURING SYSTEMS

John U. White, Darien, Conn., assignor to The White Development Corporation, Stamford, Conn., a corporation of Connecticut Application March 29, 1956, Serial No. 574,664

17 Claims. (Cl. 250—83.3)

This invention relates to high-speed measuring systems, and components of such systems, and particularly to apparatus for controlling the speed of response of such systems so as to minimize the effect of certain random variations in signals while obtaining high-speed measuring of the true signal.

The invention has special advantages in certain systems for measuring radiation, particularly those for measuring a selected portion of a spectrum which is characteristic of a sample.

Among the systems to which the invention is especially applicable are those including monochromators, spectrometers, spectrophotometers, spectrographs, mass spectrographs, photoelectric photometers, and the like.

Some such systems may include means for producing radiation characteristic of a sample, dispersing means for producing a spectrum, and means responsive to selected portions of the spectrum for producing an electrical signal. In such systems, there are certain irregularities which cause random, spurious variations in the electrical signal output, which conceal the true value of the signal.

An object of the present invention, in one of its forms, is to minimize the effect of these spurious variations, while not adversely affecting the size of a steady signal. The arrangement is of such a nature that it responds rapidly to large changes in input, but slowly to small changes. Consequently it is capable of responding rapidly to large changes in the portion of a spectrum being measured. This is particularly advantageous in a system for measuring differences in samples by differences in the spectra which they produce, under conditions where the differences occur so rapidly that the complete system would otherwise not be able to follow them closely.

In minimizing the effect of random, spurious variations, the apparatus described herein does not "clip off" either small or large variations, but tends to average them out when they are of short duration. This is a very advantageous feature, especially because of the type of system in which the invention is employed. In such systems, it is desired that the indicator or recorder be responsive to the steady value of the true signal, and to small changes in steady value, as well as to large changes in it.

In one illustrative form, the arrangement for producing the effect described above includes, in combination with spectrum-sensing means for generating a signal voltage, a first low-pass filter, having its output voltage applied across a non-linear filter. The first filter reduces the amplitude of the spurious variations below a threshold value at which the non-linear filter has a fast-response mode of operation. The non-linear filter is, in this illustration, a series circuit, comprising a condenser in series with a parallel circuit, the parallel circuit comprising a fixed resistor and two non-linear resistance elements (varistors) in parallel, the non-linear resistance elements each having a preferred direction of current flow, and facing in opposite directions. The voltage appearing across the condenser is applied to an output circuit including a voltage-responsive device for indicating the measured intensity of the selected portion of the spectrum. Each of the non-linear resistance elements presents an effective resistance which varies with the instantaneous value of current or voltage applied to its terminals. Such elements are sometimes called varistors.

For small signals the circuit has a relatively long response time. This diminishes the effect of random variations in the signal.

The non-linear resistance elements, connected together in this manner, act to provide, in series with the condenser, an effective amount of resistance which is smaller for large signals than for small signals. This change from high effective resistance to low effective resistance is rather steep, and the voltage applied across the series circuit needed to small effect this change may be referred to as its threshold voltage.

For large changes in the input, because of the low effective resistance, the system responds quickly, as is desired. Because the first filter reduces the spurious variations below the threshold voltage of the second filter, this has the effect of preventing these spurious variations from shifting the system to its fast-response mode of operation.

As a result, the system discriminates against spurious variations but responds quickly to the true signal.

These and other features and objects obtainable by the practice of the present invention will be readily understood by persons skilled in the art by reference to the following detailed description taken in connection with the drawings which describe and illustrate one embodiment of the invention.

Figure 1 is a schematic diagram, partly in block diagram form, of a system for measuring the intensity of a selected portion of a spectrum characteristic of a sample.

Figure 2 is a circuit diagram corresponding to those portions of Figure 1 following the monochromator.

Figure 5 is a circuit diagram of another form of the system.

Figure 3:
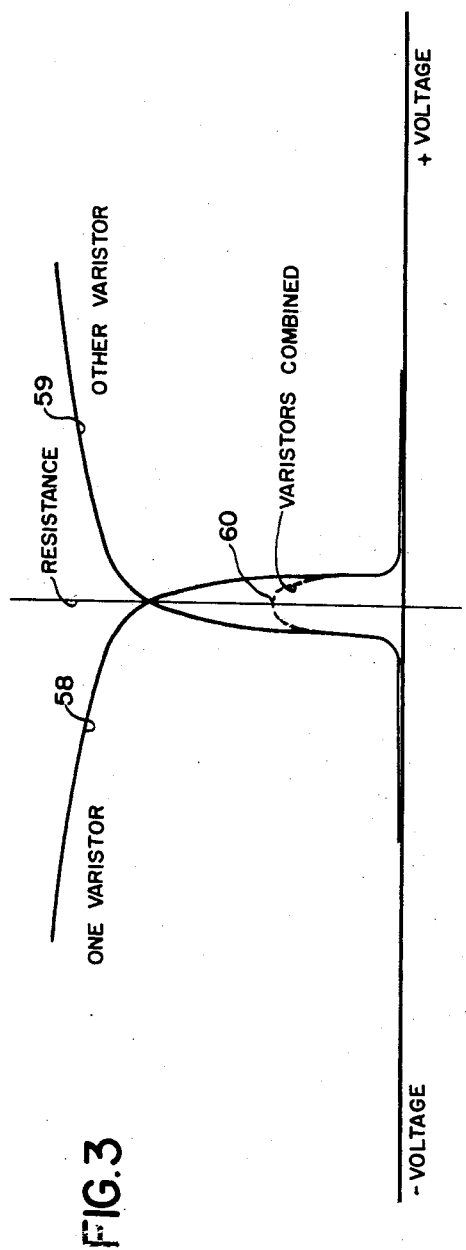
Figures 3 and 4 are plots of resistance versus voltage, to be used in explaining certain components shown in Figure 2.

In Fig. 1, visible or invisible light from a source 17 is directed through a sample 18 that absorbs selectively at some wave lengths characteristic of the sample. Light, from the source, after being modified by the sample, then enters a monochromator 19.

The monochromator may be of a known type. It includes jaws forming an entrance slit, jaws forming an exit slit, and means including a dispersing element defining a light path from the entrance slit to the exit slit, and for forming at the exit slit a dispersed image of the entrance slit. The dispersing element may, for example, be a prism. The exit slit is movable to various positions to enable the selection of a portion of the dispersed image of the entrance slit representing the wave length components of the spectrum to be measured.

In this manner, light of the wave length characteristic of the element to be measured is isolated from the total radiation entering the monochromator, and is applied to a photoelectric device 20. This device may, for example, comprise a photomultiplier tube, such as a type 931-A. An output voltage related in magnitude to the light striking the photoelectric device appears in its output circuit. This voltage is applied to a first or preliminary filter 21, then to a cathode follower 25, and then to a non-linear filter circuit 26. The output of the circuit 26 is applied to an amplifier or cathode follower 27, and then to a recorder 28 having a movable element for indicating the measured value of the selected portion of the spectrum. The recorder may satisfactorily be a recording voltmeter, for example, of the Leeds & Northrup Speedomax type, with a one-second, full-scale response time.

The sample may be varied as a function of time, or the wave length isolated by the monochromator may be varied.

In measuring apparatus of the character described herein, in addition to the desired signal which represents the quantity being measured, there occur certain undesired, spurious variations. One type of such spurious variation may arise from irregularities in the performance of the apparatus which produces radiation characteristic of the sample. Another type of such spurious variation arises from irregularities in the performance of the radiation-sensing means. These spurious variations conceal the true value of the signal.

In measuring systems of this type the nature of the true signal and of the spurious variations, and their relation to each other, is different from those of many other types of signals and spurious variations. In the present instance, the true signal usually includes both D.-C. and A.-C. components, each significant, and the spurious signals are mainly small in magnitude or duration and random in nature. By random is meant that they may be irregular or non-uniform in duration, frequency of recurrence, amplitude, or wave shape. The measurement is of such a nature that smoothing or low-pass filtering may be employed, provided means are employed to provide a faster response to large changes in the signal than to small variations, and to prevent the spurious variations from shifting the system to its fast-response condition.

To measure the signal more accurately in the presence of these variations, the circuit 26 and the preliminary filter 21 are employed. The signal fed to the circuit 26 is integrated over an appreciable length of time, and the undesired variations are smoothed out, while the size of a steady signal is not changed. Besides reducing the undesired variations, the circuit 26 also makes the output signal respond slower to small changes in the input or in the sample. A feature of the action of the circuit 26 is that it responds rapidly to large changes in the input but slowly to small changes, so that it averages out the undesired random variations, but is quickly responsive to large changes in the radiation from the sample. During a brief moment when such a large change is occurring, the random variations are not reduced, but for some applications this is not objectionable.

With the arrangement described herein, it is possible to make the recorder travel full-scale on the chart, in response to a large signal change, in very little more time than it needs to travel, say, one-tenth of the distance across the chart in response to a signal one-tenth as large as the full-scale signal.

As shown in Figure 2, a signal is derived from a spectrum-sensing element, illustrated as a photoelectric device, comprising in this instance a photomultiplier tube 20a. The tube 20a has an anode, a cathode, and a series of dynodes. The anode and cathode are connected in series with a resistor 29 and a direct-current power supply 30. Suitable potentials are applied to the dynodes. The bottom of the resistor 29 is, as shown in the drawings, maintained at a fixed potential with reference to ground by a connection to a voltage tap in a direct current voltage supply 53, one terminal of which is grounded. The junction point between the photomultiplier tube 20a and the resistor 29 is designated as 29a. The output voltage appearing at this point, with respect to a reference potential, in this instance ground, is determined by the light (visible or invisible) striking the tube. This voltage is applied to the preliminary filter, as has been described in connection with Figure 1. In Figure 2, this preliminary filtering is performed by a condenser 31, together with the effective output impedance of the circuit which supplies the signal to this condenser. Thus the tube 20a itself has a high effective internal resistance. The effective impedance looking to the left from the upper terminal of the condenser 31, considering the effect of the internal resistance of the tube 20a and the resistor 29, includes a significant amount of series resistance. The condenser 31, together with the last-mentioned effective series resistance, serves as a preliminary filter or integrating circuit.

In some arrangements other forms of preliminary filters may advantageously be used. For example, another resistor may be inserted between the points 29a and 31a, and may cooperate with the condenser in the preliminary filtering.

The signal from the filter condenser 31 is applied to the grid 32 of the cathode follower 25, comprising a tube 33, which has an anode 34, a cathode 35, and a cathode resistor 36. The resistor 29 serves as a grid resistor for this tube.

The output voltage from the cathode 35 is applied to the non-linear filter, indicated generally as 26, which includes a condenser 37 connected in series with a parallel circuit. The parallel circuit comprises, in this instance, a fixed resistor 38 and two non-linear resistance elements 39 and 40, all connected in parallel. The expression "non-linear resistance element," or "variable resistance element," as used herein, means an element having an effective resistance which varies with the current or voltage applied to its terminals. The non-linear resistance elements 39 and 40 may, as indicated previously, be of the type called varistors, which term is herein employed to denote a semi-conductor device having a voltage-dependent non-linear resistance. As illustrated in the drawings, the elements 39 and 40 may be semi-conductor rectifiers having the above defined resistance characteristics. They may comprise rectifier material having suitable properties, for example, copper oxide, selenium, or germanium. The elements 39 and 40 are, as shown, connected facing in opposite directions. The junction point between the condenser 37 and the parallel circuit is indicated as 41.

The voltage appearing across the condenser 37 is applied to the input circuit of an isolating amplifier or cathode follower 27 comprising a vacuum tube 45, having an anode 46, a cathode 47, and a grid 48. The cathode resistor comprises a resistor 49, in parallel with which there is connected a voltage-dividing resistor arrangement comprising the resistors 50 and 51, having a junction point 52. The cathode follower 27, having a high input impedance, provides a high output impedance for the circuit 26.

A power supply 53 serves to energize the tubes 33 and 45. Connected across the power supply is a resistance-type voltage-dividing circuit including the resistors 54 and 55.

The output voltage derived between the junction point 52 and a slider 56 associated with the resistor 55 is applied to the recorder 28. The slider 56 permits an adjustment so that the recorder reads zero for some desired value of the signal.

Figure 4:
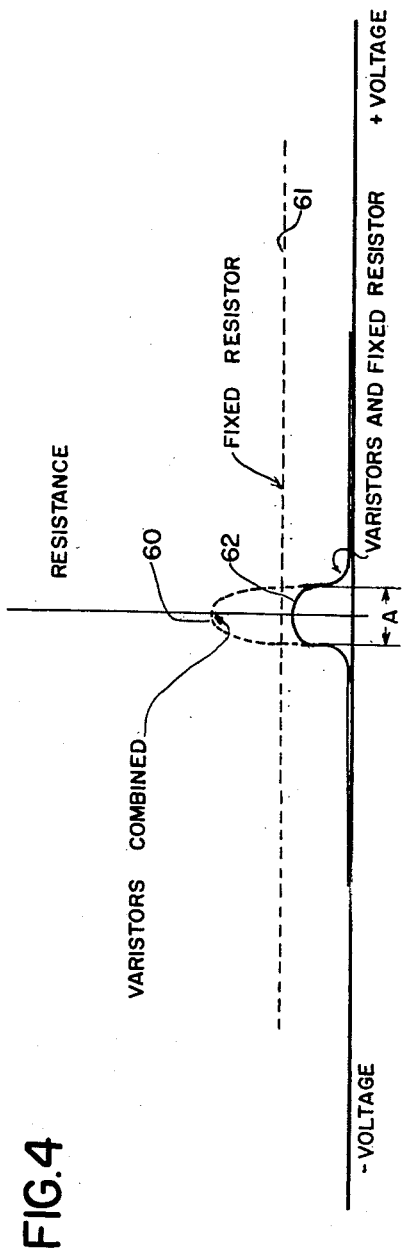

Reference is now made to Figures 3 and 4. Fig. 3 shows the resistance-versus-voltage relationships of the non-linear resistance elements (varistors) 39 and 40, individually and combined in parallel. Fig. 4 shows the relationships between the combined resistance of the two non-linear resistance elements, that of the resistor 38, and the combined resistance of all three in parallel, for various applied voltages. Curve 58 represents the resistance of one of the non-linear resistance elements, for example, 39, as a function of the voltage across its terminals. Curve 59 represents the resistance of the other non-linear resistance element, for example, 40. Curve 60 represents their combined resistance, as a function of the voltage across their terminals. Curve 61 in Figure 4 represents the fixed resistance of the resistor 38. Curve 62 represents the combined resistance of all three elements, namely, the elements 39 and 40 and the resistor 38. The combined resistance of the non-linear resistance elements, as shown by the curve 60, is larger than the resistance of the resistor 38, for small signals, and is smaller than that of the reistor 38 for large signals.

As is explained in more detail subsequently, in certain alternative arrangements, it is possible to omit the resistor 38.

Operation of the circuit

In operation, a signal related to the energy in a selected portion of a spectrum is applied to the preliminary filter circuit 21 and the output from this filter is applied, via the cathode follower 25, to the non-linear filter circuit 26.

For small signals reaching the circuit 26, the non-linear resistance elements 39 and 49 have a relatively high resistance, and the time constant of the circuit is determined primarily by the product of the resistance of the resistor 38, R, and the capacitance of the condenser 37, C. This time constant, RC, is chosen to provide an integrating effect, to reduce the effect of random variations in the signal.

For large signals, the non-linear resistance elements have the effect of lowering the effective resistance and thereby shortening the time constant of the circuit 26. The shortened time constant has the effect of causing the system to be rapidly responsive to the large changes, as desired.

The preliminary filter attenuates spurious variations applied to it to such an extent that at the input to the circuit 26 they are not large enough to be greater than the threshold value at which the variable resistance elements 39 and 40 cause the circuit 26 to have a short time constant. For this purpose the preliminary filter reduces the spurious variations below the voltage magnitude range indicated as A in Fig. 4. The voltage boundaries of the range A represent approximately the threshold value for the circuit 26.

The preliminary filter has, in the illustrative arrangement, a time constant greater (slower) than that of the circuit 26 when this circuit is acting in its fast range. The time constant of the preliminary filter is in most arrangements appreciably smaller (faster) than that of the circuit 26 when this circuit is in its slow range.

The action of the system is such that the effects of random variations are minimized, but the circuit and recorder respond not only to large changes in the output voltage from the photoelectric device, but also to small changes to a new, steady value. In this connection it may be noted that the system is responsive not only to A.-C. but also to D.-C. components of the true signal.

Illustrative components

The following table gives illustrative circuit components which have been found satisfactory.

| Components, Designated by Reference Numerals | Values |
| --- | --- |
| Resistors: | |
| 29 | 10 megohms. |
| 36 | 10,000 ohms. |
| 38 | 100,000 ohms. |
| 49 | 10,000 ohms. |
| 50 | 39,000 ohms. |
| 51 | 100,000 ohms. |
| 54 | 180,000 ohms. |
| 55 | 1,000 ohms. |
| Non-linear resistance elements (varistors): | |
| 39 and 40 | Type 19P A1V. |
| Maximum resistance of elements 39 and 40, in parallel opposed relation. | 1,000,000 ohms. |
| Vacuum Tubes: | |
| 33 and 45 | The two halves of a type 12AT7 tube. |
| Photoelectric device 20-a | Type 931-A photomultiplier tube. |
| Condensers: | |
| 31 | 0.01 microfarads. |
| 37 | 16 microfarads. |

As an illustration of how the time constant of the circuit 26 may vary with the size of the signal it will be pointed out that in one illustrative circuit, with an applied signal of 0.1 volt at the input to this circuit, the time constant was 1.5 seconds. With a larger signal, 6 volts, the time constant was somewhat less than 0.1 second. The time constant of the preliminary filter was about 0.1 second.

Other Arrangements

In the form shown in Fig. 2, the non-linear filter circuit 26 comprises, as has been described, a condenser in series with a parallel circuit, which in turn comprises the fixed resistor 38 and the two non-linear resistance elements 39 and 40. Although this circuit has certain unique advantages in many circumstances, in some other circumstances, a circuit can be used like 26 except omitting the fixed resistor 38, provided non-linear resistance elements having suitable characteristics are available. In this case, the non-linear filter circuit would comprise a condenser in series with two parallel-connected, oppositely-arranged non-linear resistance elements.

Although, in the illustrative arrangement which has been described, two or more non-linear resistance elements may be used, of the type having a preferred direction of current flow, in certain other arrangements, an element may be used of a type having high resistance for small signals in either direction and low resistance for large signals in either direction. A single such element may be used instead of two. Silicon carbide is an example of a material from which such an element may be made. The change in resistance is usually not as great for such an element as for the "preferred-direction" type of element previously described, and in most applications the latter is better.

In Figure 2 the cathode follower 25 serves to provide a low impedance, looking to the left from the input terminals of the circuit 26. This low impedance is desirable to permit this circuit to respond rapidly to large changes in signal. In one variation, the preliminary filter may immediately precede the circuit 26, without an intervening cathode follower, provided the preliminary filter has a sufficiently low output impedance to permit the remainder of the system to respond as quickly as required to large changes in the signal. In this arrangement the output from the photoelectric device may be applied to a cathode follower followed by the preliminary filter and then the circuit 26. In this arrangement the preliminary filter may comprise a series resistor and shunt condenser. Multiple-stage filters may also be used.

Reference is now made to Fig. 5. This circuit, although not having all the properties of that shown in Fig. 2, may be used satisfactorily in some cases to minimize the effect of random signal variations while obtaining high-speed measuring of the true signal.

The arrangement of Fig. 5 uses a preliminary filter like that of Fig. 2, but a different non-linear filter. Fig. 5 shows an adjustable bias applied to each of the rectifiers 65 and 66. For the best performance, this bias voltage may in some cases be in a direction opposite to the preferred direction of current flow, and in other cases may be in the direction of preferred current flow, depending upon the characteristics of the particular rectifiers. For this purpose, the cathode circuit of the first cathode follower includes a fixed resistor 67, a resistor 68 having a variable tap 69, and a resistor 70 having a variable tap 71. One terminal of the rectifier 65 is connected to the tap 69. One terminal of the rectifier 66 is connected to the tap 71.

The junction point 72 between the resistors 68 and 70 is connected by a resistor 73 to the junction point 74 between the rectifiers. Between the point 74 and the grounded lower end of the resistor 67 is connected a condenser 75. It may be observed that the input circuit for the non-linear filter is resistive in nature.

The remainder of the circuit elements are self-explanatory in view of the previous description of Fig. 2.

The preferred direction of (positive) current flow through the rectifier 65 is from right to left. The preferred direction through the rectifier 66 is from left to right. The voltage drop through the resistors 68 and 70 therefore tends to bias the rectifiers 65 and 66. Adjustment of the bias voltages applied to these rectifiers by the variable taps 69 and 71 enables adjustment of the operating characteristics of the system and makes the initial choice of values of the circuit components less critical than in Fig. 2, for optimum results.

The circuit of Fig. 5 responds rapidly to large signals, but the effect of small random variations is minimized. It has a short effective time constant for large signals, but a long time constant for small variations. It depends to an important extent upon the action of the preliminary filter, which assures that spurious variations at the input to the non-linear filter are not great enough to shift it to its short-time-constant condition.

The effect of the voltage drop through those portions of the resistors 68 and 70 lying between the taps 69 and 71 is to require a slightly different voltage change in order to shift the non-linear filter to its short-time-constant condition. These variable taps are adjusted to give the optimum characteristic to the non-linear filter and the system, to produce rapid response by the recorder while minimizing the effect of spurious variations.

It will be understood that the present invention is useful not only in measuring a selected portion of a spectrum where the same wave lengths are selected for a considerable duration of time, and the nature of the sample is changed with time, but also in measuring a selected portion of the spectrum from an unchanging sample where the spectrum is scanned so that the wave lengths selected change with time.

It will be understood that when the present invention is used to measure a selected portion of a spectrum of visible or invisible light, a variety of arrangements other than that shown in Fig. 1 may be employed for producing and selecting the desired portion of the spectrum to be measured.

The present invention may, as previously mentioned, be used in spectrum-measuring systems of the mass-spectrograph type. In such systems, a dispersing element is used of a type adapted to disperse particles of differing mass. It may, for example comprise means for establishing suitable magnetic and electric fields, acting on moving charged particles, in order to disperse them into a spectrum according to their mass. The sensing element may, in such an arrangement, be of an ionization type. The output voltage from the sensing apparatus would be applied to the preliminary filter. Because mass spectrographs per se are known, further description of them is unnecessary for present purposes.

While an illustrative form of the invention has been disclosed in considerable detail, it will be understood that various changes may be made in the construction and arrangement of the several parts without departing from the general principles and scope of the invention as defined by the appended claims.

I claim:

1. Spectrum-measuring apparatus, for testing samples, comprising means for producing radiation characteristic of a sample, radiation-dispersing and sensing means, for producing an electrical signal indicative of the intensity of said radiation in selected portions of its spectrum, an integrating circuit comprising a condenser and a parallel circuit, said parallel circuit comprising a fixed resistor and two variable resistance elements all connected in parallel, each of said variable resistance elements having a preferred direction of current flow and having a resistance which varies with the voltage applied to it, said variable resistance elements being connected in opposite directions, means applying across said integrating circuit a signal derived from said radiation-sensing means, and a device including a member movable in response to the voltage across said condenser, the combined parallel resistance of said variable resistance elements being larger than the resistance of said fixed resistor for small signals and smaller than same for large signals, said integrating circuit comprising a non-linear filter adapted to minimize the response of said device to spurious variations in said signal by averaging them out but to cause it to respond to the steads value of the true signal and to small, persistent changes in that steady value.

2. In a light measuring system, in combination, a photoelectric device producing a signal voltage and random, spurious variations, a preliminary low-pass filter, input coupling circuit means, a non-linear low-pass filter, output coupling circuit means, and a voltage-responsive indicating device, connected in the order stated, said non-linear filter including in a first branch circuit a first varistor connected between said input coupling circuit means and said output coupling circuit means, and in a second branch circuit a second varistor connected between said input coupling circuit means and said output coupling circuit means, said varistors facing in opposite directions, said non-linear filter having a fast-response mode of operation for voltages applied to it greater than a threshold value, said preliminary filter comprising an integrating network adapted to prevent said random spurious variations from exceeding said threshold value at the input terminals of said non-linear filter, whereby to minimize the response of said indicating device to said spurious variations but to cause it to respond rapidly to large changes in the signal voltage.

3. In a light-measuring system, in combination, a photoelectric device producing a signal voltage and random, spurious variations, a preliminary low-pass filter, a non-linear low-pass filter, and a voltage-responsive indicating device, connected in the order stated, said non-linear filter including non-linear resistance means giving it a fast-response mode of operation for voltages applied to it greater than a threshold value, said preliminary filter comprising an integrating network adapted to prevent said random spurious variations from exceeding said threshold value at the input terminals of said non-linear filter, said non-linear filter being adapted to cause said indicating device to respond to the steady value of said signal voltage and to small, persistent changes in that steady value but being adapted to minimize the effect of said spurious variations.

4. Apparatus for measuring light, comprising a photoelectric device for producing a voltage related to the amount of light striking said device, a preliminary filter, a non-linear filter, and an indicating device responsive to the output voltage from said non-linear filter, connected in the order stated, said non-linear filter comprising a condenser connected in series with a parallel circuit, said parallel circuit comprising a pair of non-linear resistance elements and a fixed resistor, all connected in parallel, said non-linear resistance elements facing in opposite directions and having a significantly smaller combined resistance for applied voltages greater than a threshold value than for applied voltages less than said value, said preliminary filter comprising an integrating network adapted to reduce the value of spurious voltage variations from said photoelectric device below said threshold value, the maximum combined effective resistance of said variable resistance elements being greater than the resistance of said fixed resistor.

5. In a measuring system, in combination, a photoelectric device for generating a voltage related to the value of light striking said device, preliminary low-pass filter means comprising an integrating network in the output circuit of said device, a series circuit including a condenser and a parallel circuit, said parallel circuit including a plurality of oppositely-facing, parallel-connected, variable resistance elements, the resistance of said elements varying with the applied voltage, means applying the voltage from said preliminary filter means across said series circuit, and a device including a variable member responsive to the voltage across said condenser, said variable resistance elements together providing a large resistance in response to small voltage variations from said device and a smaller resistance in response to large voltage variations, to cause said variable member to be rapidly responsive to large changes in said light striking said photoelectric device and also to cause said variable member to be responsive to small, persistent changes in the steady value of said light but to cause the effects on said variable member of spurious variations in the voltage from said photoelectric device to be minimized.

6. Light-measuring apparatus, comprising, in combination, a photoelectric device for generating a voltage related to the amount of light striking said device, a filter circuit having input and output terminals and comprising an integrating network including a condenser connected across said output terminals and including a pair of non-linear resistance elements, each having one of its electrodes connected to one of said input terminals and its other electrode connected to one of said output terminals, whereby the voltage impressed across each of said non-linear resistance elements is the same, said elements facing in opposite directions, means applying a voltage derived from said photoelectric device to said input terminals, and an indicating device responsive to the voltage across said condenser, whereby said filter circuit minimizes the response by said indicating device to spurious variations in the voltage from said photoelectric device.

7. In a measuring system, sensing means for generating a voltage related to the value of the quantity to be measured, an integrating circuit comprising a fixed resistor connected in series with a capacitance element, a pair of non-linear resistance elements, facing in opposite directions, each connected in parallel with said resistor, each of said non-linear resistance elements having a preferred direction of current flow, means applying a voltage derived from said sensing means across the series combination of said fixed resistor and capacitance element, and an indicating device responsive to the voltage appearing across said condenser, the combined parallel resistance of said non-linear resistance elements being larger than the resistance of said resistor for small signals and smaller than same for large signals, to minimize the response of said indicating device to spurious variations by averaging them out but to cause it to respond to the steady value of said voltage and to small, persistent changes in that steady value and to respond rapidly to large changes in said voltage.

8. Measuring apparatus, comprising means generating a varying unidirectional voltage including components related to a quantity to be measured and also including spurious variations, a first, low-pass filter circuit, a second, non-linear filter circuit, and a device including a movable member responsive to the output voltage from said non-linear filter for indicating the magnitude of said measured quantity, connected in the order stated, said first filter comprising an integrating network adapted to reduce said spurious variations below a threshold value, said non-linear filter comprising a condenser connected in series with a circuit comprising two variable resistance elements connected directly together in parallel with each other, facing in opposite directions, the resistance of said elements varying with the voltage applied to them, said variable resistance elements being adapted to decrease the effective resistance in said non-linear filter when changes in the voltage from said first filter exceed said threshold value, whereby said device is caused to respond to persistent changes in the voltage across said condenser, both small and large, and to respond rapidly to large changes in said voltage, but whereby the effect of said spurious variations is minimized.

9. In a system for measuring a selected portion of a spectrum, of the type including spectrum-sensing means for generating a voltage related to the intensity of selected components of a spectrum, in combination, a preliminary low-pass filter, a non-linear filter, and an indicating device, connected in the order stated, said non-linear filter including a condenser connected in series individually with each of a pair of resistance circuits, said resistance circuits including variable resistance elements, oppositely arranged, one in each of said circuits, the resistance of said elements varying with the voltage applied to them, said indicating device being responsive to the voltage across said condenser, said variable resistance elements being adapted to decrease the effective resistance in said non-linear filter when the voltage applied to said non-linear filter exceeds a threshold value, said preliminary filter comprising an integrating network adapted to prevent any spurious variations of voltage derived from said spectrum-sensing means applied to said non-linear filter from exceeding said threshold value, whereby to cause said indicating device to respond to the steady value of said first-mentioned voltage and to small, persistent changes in that steady value, and to respond rapidly to large changes in said voltage, but whereby to average out the effect of said spurious variations.

10. In apparatus for measuring a selected portion of a spectrum of the type including sensing means for generating a voltage related to the value thereof, in combination, a preliminary filter for receiving said voltage, an isolating circuit having high input and low output impedance, a non-linear filter, and an indicating device, connected in the order stated, said non-linear filter including a pair of oppositely-connected non-linear resistance elements having a preferred direction of current flow, each connected individually in series with a condenser, said isolating circuit being connected to said elements and said condenser, and said indicating device having an input circuit connected across said condenser, said elements being adapted to speed up the response of said non-linear filter when the voltage applied to it exceeds a threshold value, said preliminary filter comprising an integrating network adapted to prevent spurious variations in the voltage applied to said non-linear filter from exceeding said threshold value, whereby said indicating device is rapidly responsive to large changes in the selected portion of said spectrum but the effect on it of spurious variations in the voltage from said sensing means is minimized.

11. In light-measuring apparatus, in combination, a photoelectric device producing a signal voltage and spurious, random, voltage variations, a preliminary low-pass filter, a non-linear, low-pass filter, and an indicating device connected in the order stated, said non-linear filter including a reactance element connected in series, individually, with each of two branch circuits, each of said branch circuits including a device having a voltage-dependent, non-linear resistance, said devices facing in opposite directions, said non-linear filter being adapted to present a decreased effective resistance in response to the application to said non-linear filter of voltage variations greater than a threshold value, said filters being adapted to minimize the effect of said spurious variations on said indicating device, said preliminary filter comprising an integrating network adapted to reduce spurious, random variations below the threshold value of said non-linear filter.

12. In light-measuring apparatus, in combination, a photoelectric device producing a signal voltage and spurious, random voltage variations, a preliminary low-pass filter, a coupling circuit, a non-linear, low-pass filter, and an output circuit including an indicating device, connected in the order stated, said non-linear filter including a condenser connected across its output terminals, and circuit means forming three paths between said coupling circuit and a point connected to one terminal of said condenser, one of said paths including a resistor, another of said paths including a device having a voltage-dependent, non-linear resistance, and another of said paths including another non-linear resistance device facing in a direction opposite said first one, said non-linear filter having a fast-response mode of operation for voltages applied to it greater than a threshold value, said preliminary filter comprising an integrating network adapted to prevent random, spurious variations in the voltage applied to said non-linear filter from exceeding said threshold value.

13. Apparatus as in claim 12 in which said coupling circuit comprises means for applying bias voltage to each of said non-linear resistance devices.

14. In a light measuring system, in combination, a photo-electric device producing a signal voltage and random, spurious variations, a preliminary integrating network, a non-linear integrating network, and a voltage responsive device for indicating the amplitude of said signal voltage, connected in the order stated, said preliminary integrating network being adapted to prevent random, spurious variations applied to said non-linear integrating network from exceeding a threshold value, said non-linear integrating network having a relatively large time constant for voltages applied thereto below said threshold value and having a relatively small time constant for voltages applied thereto above said threshold value, said non-linear integrating network being adapted to cause said voltage responsive device to respond to said signal voltage but being adapted to minimize the effect of said spurious variations.

15. In a light measuring system, in combination, a photo-electric device producing a signal voltage and random, spurious variations, a preliminary integrating network, a non-linear integrating network, and a voltage responsive device for indicating the amplitude of said signal voltage, connected in the order stated, said preliminary integrating network being adapted to prevent random, spurious variations applied to said non-linear integrating network from exceeding a threshold value, said non-linear integrating network having a relatively large time constant for voltages applied thereto below said threshold value and having a relatively small time constant for voltages applied thereto above said threshold value, said preliminary integrating network having a time constant of a value intermediate said relatively large time constant and said relatively small time constant, said non-linear integrating network being adapted to cause said voltage responsive device to respond to said signal voltage but being adapted to minimize the effect of said spurious variations.

16. In a light measuring system, in combination, a photo-electric device producing a signal voltage and random, spurious variations, a preliminary integrating network, a coupling circuit, a non-linear integrating network, and an output circuit including a voltage responsive device for indicating the amplitude of said signal voltage, connected in the order stated, said preliminary integrating network being adapted to prevent random, spurious variations applied to said non-linear integrating network from exceeding a threshold value, said non-linear integrating network including a condenser connected across the output terminals thereof and including resistance means connected between said coupling circuit and a point connected to one terminal of said condenser, said resistance means including two voltage dependent, non-linear resistance devices, said non-linear integrating network having a relatively large time constant for voltages applied thereto below said threshold value and having a relatively small time constant for voltages applied thereto above said threshold value, said preliminary integrating network having a time constant of a value intermediate said relatively large time constant and said relatively small time constant, said non-linear integrating network being adapted to cause said voltage responsive device to respond to said signal voltage but being adapted to minimize the effect of said spurious variations.

17. In a light measuring system, in combination, a photo-electric device producing a signal voltage and random, spurious variations, a preliminary integrating network having a pair of output terminals, a coupling circuit, a non-linear integrating network, and an output circuit including a voltage responsive device for indicating the amplitude of said signal voltage, connected in the order stated, said preliminary integrating network being adapted to prevent said random, spurious variations applied to said non-linear integrating network from exceeding a threshold value and including a first condenser connected across the output terminals of said preliminary integrating network, said non-linear integrating network including a second condenser connected across the output terminals thereof and including resistance means forming three paths between said coupling circuit and a point connected to one terminal of said second condenser, one of said paths including a resistor, another of said paths including a device having a voltage dependent, non-linear resistance, and another of said paths including another non-linear resistance device facing in a direction opposite to said first one, said non-linear integrating network having a relatively large time constant for voltages applied thereto below said threshold value and having a relatively small time constant for voltages applied thereto above said threshold value, said preliminary integrating network having a time constant of a value intermediate said relatively large time constant and said relatively small time constant, said non-linear integrating network being adapted to cause said voltage responsive device to respond to the steady value of said signal and to small, persistent changes in that steady value but being adapted to minimize the effect of said spurious variations.

References Cited in the file of this patent

UNITED STATES PATENTS

| | | |
|---|---|---|
| 2,119,194 | Babler | May 31, 1938 |
| 2,122,748 | Mayer | July 5, 1938 |
| 2,686,266 | Pringle et al. | Aug. 10, 1954 |
| 2,742,576 | Dandl | Apr. 17, 1956 |

FOREIGN PATENTS

| | | |
|---|---|---|
| 681,968 | Great Britain | Oct. 29, 1952 |

OTHER REFERENCES

"Chambers Technical Dictionary," MacMillan Company, 1944, page 886.

Harppell et al.: "Engineering Electronics," McGraw-Hill, 1953, page 470.

UNITED STATES PATENT OFFICE
CERTIFICATE OF CORRECTION

Patent No. 2,899,561                                                        August 11, 1959

John U. White

It is hereby certified that error appears in the printed specification of the above numbered patent requiring correction and that the said Letters Patent should read as corrected below.

Column 2, line 16, strike out "small"; column 8, line 9, for "steads" read -- steady --.

Signed and sealed this 31st day of May 1960.

(SEAL)
Attest:

KARL H. AXLINE                                                      ROBERT C. WATSON
Attesting Officer                                                Commissioner of Patents